United States Patent [19]

Gajewski et al.

[11] 4,155,894
[45] May 22, 1979

[54] COMPOSITION FOR PREPARING URETHANE/UREA BLOCK COPOLYMERS

[75] Inventors: Vincent J. Gajewski, Jackson; Gabriel Karoly, Springfield, both of N.J.; Elliot Eisenbach, New York, N.Y.

[73] Assignee: M&T Chemicals Inc., Stamford, Conn.

[21] Appl. No.: 844,821

[22] Filed: Oct. 25, 1977

[51] Int. Cl.$^2$ .................. C08K 5/15; C08G 18/32; C08K 5/45; C08K 5/06
[52] U.S. Cl. .................. 260/30.4 N; 252/182; 260/30.8 R; 260/30.8 DS; 260/33.2 R; 528/48; 528/79; 528/906
[58] Field of Search .............. 260/75 NH, 75.5 AM, 260/2.5 AF, 30.8 DS, 30.8 R, 30.4 N, 33.2 R; 252/182; 528/48, 85, 79

[56] References Cited

U.S. PATENT DOCUMENTS

| | | | |
|---|---|---|---|
| 3,499,858 | 3/1970 | Strassel | 260/30.8 DS |
| 3,650,993 | 3/1972 | Zocco et al. | 260/2.5 AF |
| 3,745,203 | 7/1973 | Harper | 260/2.5 AF |
| 3,920,617 | 11/1975 | Hirosawa et al. | 260/77.5 AM |
| 3,929,730 | 12/1975 | Graefe et al. | 260/77.5 AM |
| 3,933,692 | 1/1976 | Kuchlefsky et al. | 260/77.5 AM |
| 3,940,371 | 2/1976 | Case | 260/77.5 AM |
| 4,017,464 | 4/1977 | Kimball | 260/77.5 AM |
| 4,031,049 | 6/1977 | Hirosawa et al. | 260/77.5 AM |

*Primary Examiner*—H. S. Cockeram
*Attorney, Agent, or Firm*—Kenneth G. Wheeless; Robert Spector

[57] ABSTRACT

The maximum concentration of specified sulfur-containing diamines that can be dissolved in polyols employed to prepare elastomeric urethane/urea block copolymers is significantly increased by the addition to said polyols of from 1 to 10% by weight of specified aprotic organic solvents containing oxygen, sulfur or both of these elements.

7 Claims, No Drawings

COMPOSITION FOR PREPARING URETHANE/UREA BLOCK COPOLYMERS

BACKGROUND OF THE INVENTION AND PRIOR ART STATEMENT

This invention relates to the preparation of polyurethane compositions. More particularly, this invention relates to compositions for preparing elastomeric polyurethanes wherein the compositions contain specified difunctional amines as the chain extender.

Elastomeric polyurethanes can be prepared using the so-called "one-shot" method whereby all of the reagents (polyol, amine chain extender, diisocyanate and catalyst) are reacted simultaneously. Alternatively the so-called "two-package" method can be used wherein a first component, an isocyanate-terminated prepolymer obtained by reacting at least a portion of the polyol with the diisocyanate compound, reacted with the second component, an amine chain extender and any remaining polyol in the presence of a suitable catalyst to obtain the final elastomer. The elastomer is believed to be a block copolymer containing urethane and urea groups in the polymer chains.

Up until recently the diamine preferred for use as a chain extender was 4,4'-methylene-bis(2-chloroaniline), which is referred to as Moca. This preference resulted from the excellent mechanical strength properties imparted to urethane elastomers by this diamine. The preference for the use of Moca has been severely restricted since regulations appeared in the Federal Register, Vol. 38, No. 144, July 27, 1973. These regulations classify Moca as a carcinogen and require certain precautions during the manufacture, handling and use of this material. These precautions have encouraged a search for less objectionable chain extending agents without sacrificing the desirable physical properties imparted by Moca. U.S. Pat. No. 3,929,730 discloses that this objective can be achieved by replacing Moca with 1,4-butanediol in combination with an amount of a second chain extender such as phenylene diethanolamine sufficient to solubilize the 1,4-butanediol in the polyol. While such a chain extender mixture may be suitable for use with diphenylmethane-4,4'-diisocyanate (MDI), it does not impart an acceptable level of physical properties, particularly strength and hardness, to elastomers derived from 2,4-tolylene diisocyanate or from mixtures of 2,4- and 2,6-tolylene diisocyanates (TDI).

U.S. Pat. No. 3,920,617 teaches that sulfur-containing diamines of the general formula

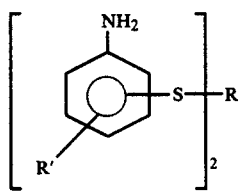

are particularly suitable chain extending or crosslinking agents for urethane type elastomers, however this class of compounds is only slightly soluble (about 12% by weight, based on polyol) in the conventional types of polyols employed to prepare elastomeric polyurethanes. This level is insufficient to impart the desired physical properties to the elastomer. Surprisingly it has now been found that by including a relatively small amount of certain aprotic solvents the solubility of this class of chain extending agents in high molecular weight polyether- and polyester polyols is more than doubled.

SUMMARY OF THE INVENTION

This invention provides a composition for preparing urethane/urea block copolymers, said composition consisting essentially of a first compound containing two hydroxyl groups selected from the group consisting of poyether polyols and polyester polyols; from 10 to about 50%, based on the weight of said first compound, of a second compound selected from the group exhibiting the general formula

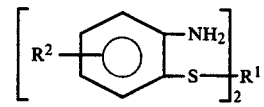

wherein $R^1$ is alkylene, cycloalkylene or arylene and contains from 1 to 12 carbon atoms and $R^2$ is hydrogen, halogen or alkyl containing from 1 to 18 carbon atoms, and from 1 to 10%, based on the weight of said first compound, of an organic liquid exhibiting a general formula selected from a group consisting of $R^3$—Z—$R^4$ and

wherein $R^3$ and $R^4$ are individually selected from alkyl groups such that the total number of carbon atoms in the molecule is from 4 to 12, $R^5$ is alkylene, alkenylene or —CH=CH—CH=CH— and contains 4 or 5 carbon atoms and Z is —S—,

—SO$_2$— or —O—.

This invention also provides a method for preparing urethane/urea block copolymers by reacting the compositions of this invention with a stoichiometric amount of a difunctional isocyanate in the presence of an effective amount of a known catalyst for isocyanate-polyol reactions.

DETAILED DESCRIPTION OF THE INVENTION

The compositions of this invention are particularly useful for preparing elastomeric urethane/urea block copolymers using the so-called "2-package" method whereby a mixture containing the desired polyol, amine chain extender and catalyst is combined with a polyfunctional isocyanate such as the aforementioned mixture of isomeric tolylene diisocyanates or prepolymers derived from these isocyanates.

Among the preferred classes of hydroxyl-terminated polyether polyols are (1) the linear polyalkylene ether polyols formed by the polymerization of alkylene oxides such as ethylene and propylene oxides and (2) glycols derived from the polymerization of heterocyclic ethers such as tetrahydrofuran. Methods for preparing these polyols are well known in the art. The preferred linear polyether polyols can be represented by the general formula HO(RO)$_x$H wherein R is alkylene containing two or more carbons or arylalkylene and x is an integer. The value of x represents an average that is preferably equivalent to an average molecular weight from about 500 to 4,000. Polyols having a higher or lower molecular weight may be useful for certain applications.

Polyester polyols are derived from the reaction of a glycol or oligomeric diol such as polypropylene glycol with a dicarboxylic acid. Suitable acids include adipic, succinic, sebacic, 1,4-cyclohexane dicarboxylic and the isomeric phthalic acids. Lactones such as ε-caprolactone can be polymerized to yield useful polyester polyols.

The amine chain extenders of the present compositions are disclosed in the aforementioned U.S. Pat. No. 3,920,617, the pertinent sections of which are hereby incorporated by reference. These chain extenders are bis(aminothiophenoxy)alkanes of the general formula

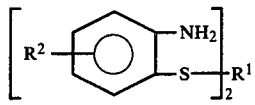

wherein $R^1$ and $R^2$ are as previously defined.

Preferably $R^1$ is lower alkyl containing from 1 to 3 carbon atoms, $R^2$ is hydrogen and the amino group and sulfur atom are located on adjacent carbon atoms. This preferred class of compounds is conveniently prepared by reacting benzothiazole with an alkali metal hydroxide followed by reaction of the resultant alkali metal o-aminothiophenoxide with the appropriate dihalide, $XR^1X$, wherein $R^1$ is previously defined and X is chlorine, bromine or iodine. Preferred dihalides include methylene chloride, 1,2-dichloroethane and 1,2-dichloropropane.

Urethane/urea copolymers are conventionally prepared by reacting one or more of the aforementioned polyols, an amine chain extender and a polyfunctional isocyanate in the presence of a suitable catalyst. Catalysts for this reaction are well known in the art and include organic and inorganic tin compounds such as dibutyltin-S,S'-bis(isooctyl mercaptoacetate) and stannous 2-ethyl hexoate. Mono- and polyfunctional tertiary amines such as N-ethyl morpholine and triethylene diamine are also useful. Preferably combinations of an amine and a tin compound are used to obtain the desired curing rate and physical properties.

As previously disclosed, the present amine chain extenders, which are solids at ambient temperature, are only slightly soluble in the preferred polyether polyols. Usually not more than about 12% by weight of the amine, based on polyol, will remain dissolved in the polyol at ambient temperature. The novel feature of this invention is that the addition of minor amounts (from 1 to about 10%, based on the weight of polyol) of certain aprotic solvents more than doubles the amount of amine that can be dissolved in the polyol. Suitable solvents include ethers, thioethers, sulfoxides and sulfones that contain from two to twelve carbon atoms. The only requirement is that the solvent be liquid at ambient temperature. Dimethyl ether is the only compound encompassed by the foregoing definition that does not satisfy this criterion. The two carbon atoms that are bonded to the oxygen or sulfur atom of the solvent can be part of two alkyl groups that may be the same or different, so long as the total number of carbon atoms in the molecule is 12 or less. Alternatively, the two carbon atoms adjacent to the heteroatom can be part of the same hydrocarbon chain which, together with the oxygen or sulfur atom to which they are bonded, forms a ring containing 5 or 6 members. The ring can be completely saturated, as in the case of tetrahydrofuran, or it may contain one or two carbon-carbon double bonds, as would be true for thiophene. The concentration of the aprotic solvent should be as low as possible so as not to adversely affect the properties of the final elastomer. The carbon atoms of the solvent may contain one or more inert substituents such as halogen.

Representatives from the various classes of suitable aprotic solvents are disclosed in the accompanying examples, which should not be interpreted as limiting the claims of this application. All parts and percentages in the examples are by weight unless otherwise stated. The physical properties of some samples were determined using American Society of Testing and Materials (ASTM) tests D-412 for tensile strength and elongation, D-624 for tear strength (die C) and D-2240 for hardness (Shore durometer A). The amine used in the examples was 1,2-bis(o-aminothiophenoxy)ethane. Samples containing 3% by weight of various solvents in a polypropylene glycol having an average molecular weight of about 2,000 were combined with from 10 to 30 g of the amine in two gram increments, heated to 85° C. with stirring, and then allowed to cool and remain at ambient temperature for 30 days. The maximum amount of amine which could remain dissolved using each of the solvents was then determined by observing which of the solutions that did not contain any solid material exhibited the highest concentration of amine. The concentration of these solutions are recorded in the following table.

| Solvent (3%, based on PPG) | Maximum Concentration |
|---|---|
| None | 12 |
| Phenyldiethanolamine (prior art) | 18 |
| Tetrahydrothiophene-1,1-dioxide | 28 |
| Dibutyl ether | 24 |
| Chlorothiophene | 24 |
| Dimethyl sulfoxide | 30 |

Elastomeric polyurethanes were prepared using (1) a solution containing 12% of 1,2-bis(o-aminothiophenoxy) ethane in the aforementioned polypropylene glycol (PPG) without any cosolvent and (2) a second solution containing 25% of the same amine in PPG containing 3% of tetrahydrothiophene-1,1-dioxide. Each of these solutions was combined with 0.4% (based on weight of PPG) of a catalyst containing 75% of a 0.33% by weight solution of triethylenediamine in dipropylene glycol, and 25% of dibutyltin-S,S'-bis(isooctyl mercaptoacetate) together with a stoichiometric amount of a liquid p,p'-diphenylmethane diisocyanate exhibiting an isocyanate index of 115. The resultant mixtures were cast into a suitable test slab mold heated to a temperature of 85° C. and allowed to cure for 15 minutes. The slab was then postcured at 85° C. for 20 hours in a circulating air oven.

The properties of each of the two slabs were measured using the ASTM tests disclosed in the preceding specification.

| Solvent | none (12% amine) | 3% Tetrahydrothiophene 1,1-dioxide (25% amine) |
|---|---|---|
| Hardness | 55 | 90 |
| Tensile strength (psi) | 800 | 2500 |
| Elongation (%) | 200 | 450 |
| Tear strength (pli, dieC) | Low+ | 150 |

+ Too low for measurement

The foregoing data demonstrate the improved properties achieved using the present solvents, which permit a higher concentration of amine to be dissolved in the polyol.

What is claimed is:

1. A composition for preparing elastomeric urethane/urea block copolymers, said composition consisting essentially of a first compound containing two hydroxyl groups selected from the group consisting of polyether polyols and polyester polyols; from 10 to about 50%, based on the weight of said first compound of a second compound selected from the group exhibiting the general formula

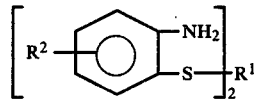

wherein $R^1$ is alkylene, cycloalkylene or arylene and contains from 1 to 12 carbon atoms and $R^2$ is hydrogen, halogen or alkyl containing from 1 to 18 carbon atoms, and from 1 to 10%, based on the weight of said first compound, of an organic liquid exhibiting a general formula selected from the group consisting of $R^3-Z-R^4$ and

wherein $R^3$ and $R^4$ are individually selected from alkyl groups such that the total number of carbon atoms in the molecule is from 4 to 12 and $R^5$ is alkylene, alkenylene or $-CH=CH-CH=CH-$ and contains 4 or 5 carbon atoms, and Z is $-O-$, $-S-$, $$-\overset{O}{\underset{\|}{S}}-$$

or $-SO_2-$.

2. A composition according to claim 1 wherein $R^1$ is alkylene and contains from 1 to 3 carbon atoms.

3. A composition according to claim 1 wherein $R^2$ is hydrogen.

4. A composition according to claim 1 wherein said first compound is a polyalkylene polyol.

5. A composition according to claim 4 wherein said first compound is a polypropylene glycol.

6. A composition according to claim 1 wherein said second compound is 1,2-bis(o-aminophenylthiophenoxy)ethane.

7. A composition according to claim 1 wherein the concentration of said organic liquid is from 1 to 5%, based on the weight of said first compound.

* * * * *